Feb. 29, 1944.　　　E. H. CLARK　　　2,342,920
EQUIPMENT FOR MAKING SPONGY RUBBER CUSHIONS OR THE LIKE
Filed Aug. 2, 1940　　　5 Sheets-Sheet 1
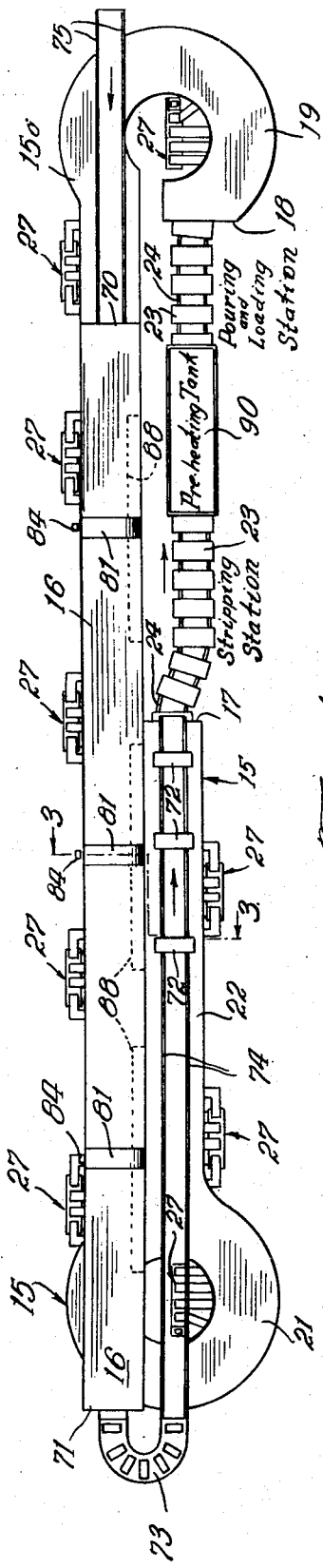
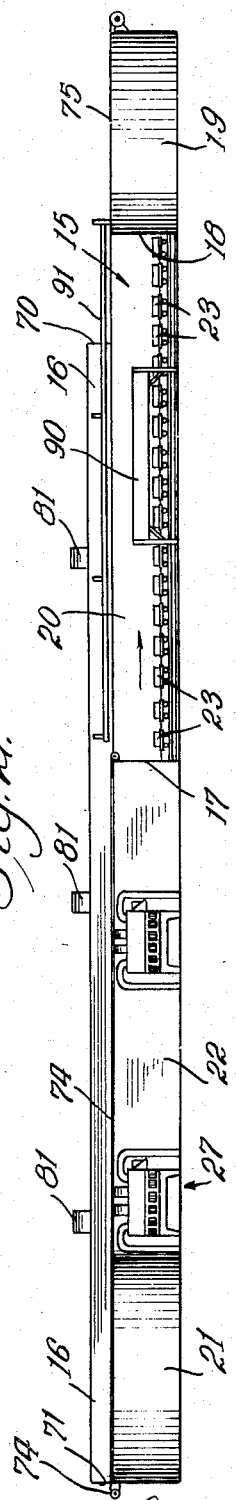
Inventor:
Edward Harding Clark
By Eugene M. Giles Atty.

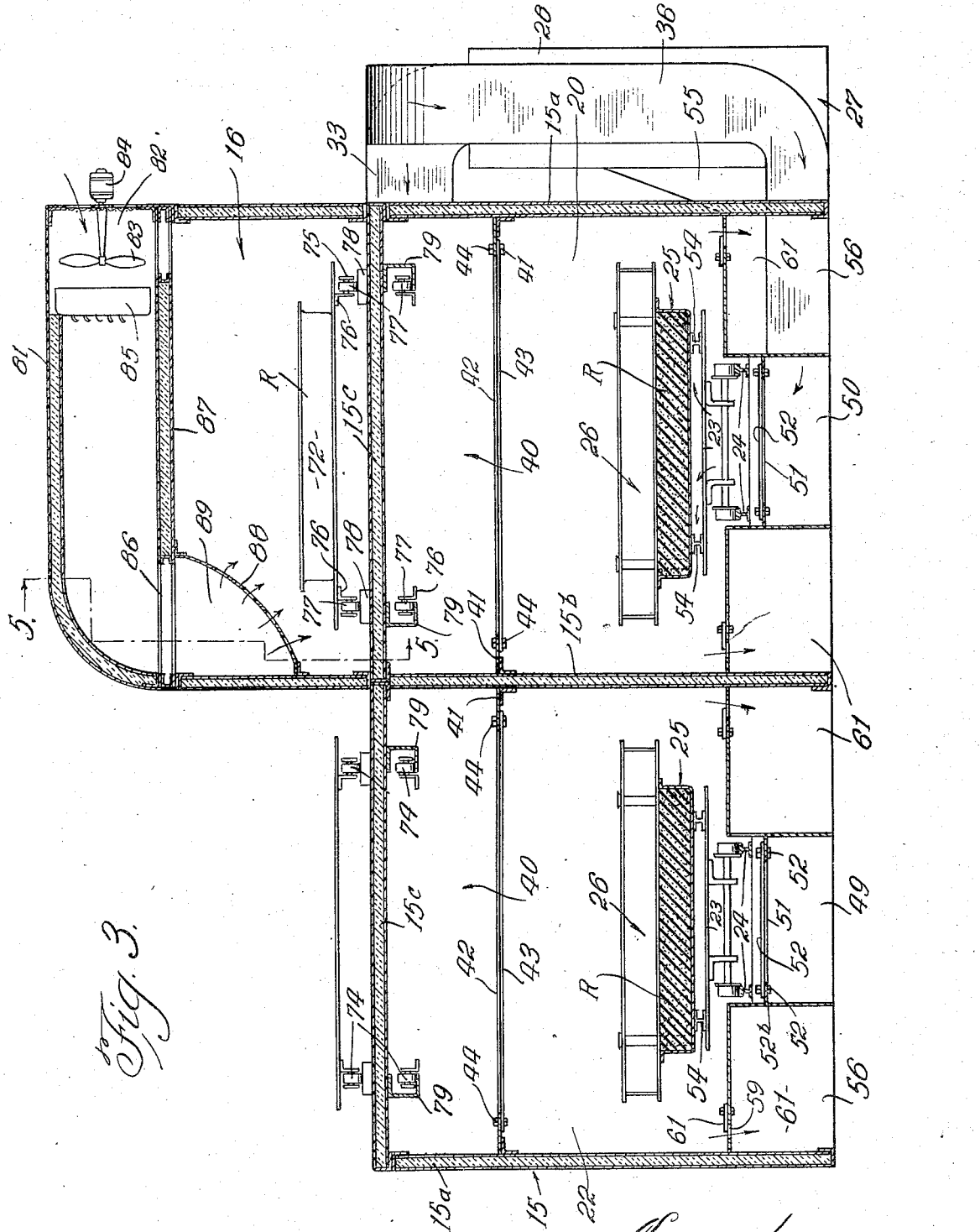

Feb. 29, 1944.  E. H. CLARK  2,342,920
EQUIPMENT FOR MAKING SPONGY RUBBER CUSHIONS OR THE LIKE
Filed Aug. 2, 1940  5 Sheets-Sheet 3
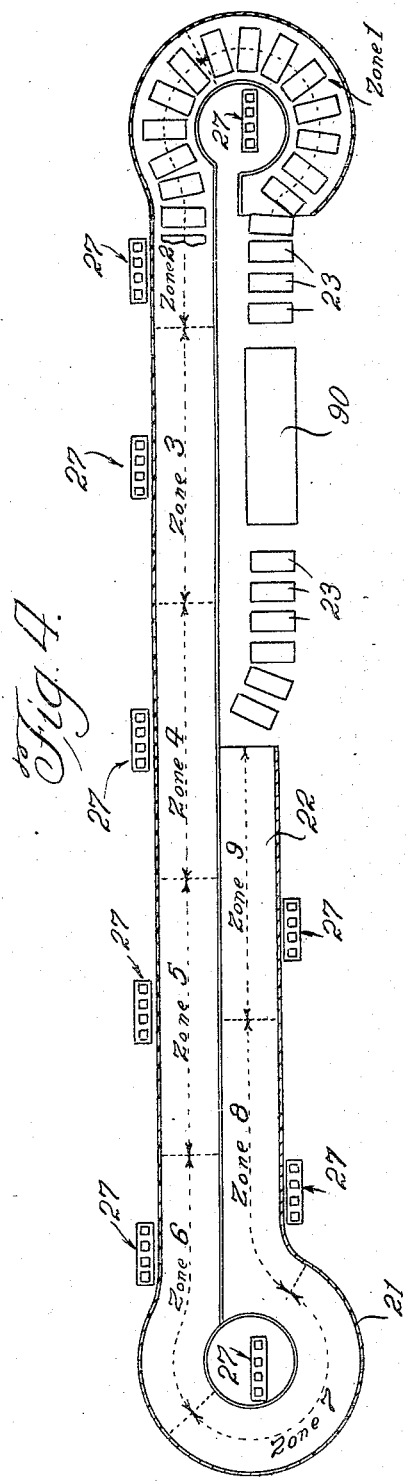
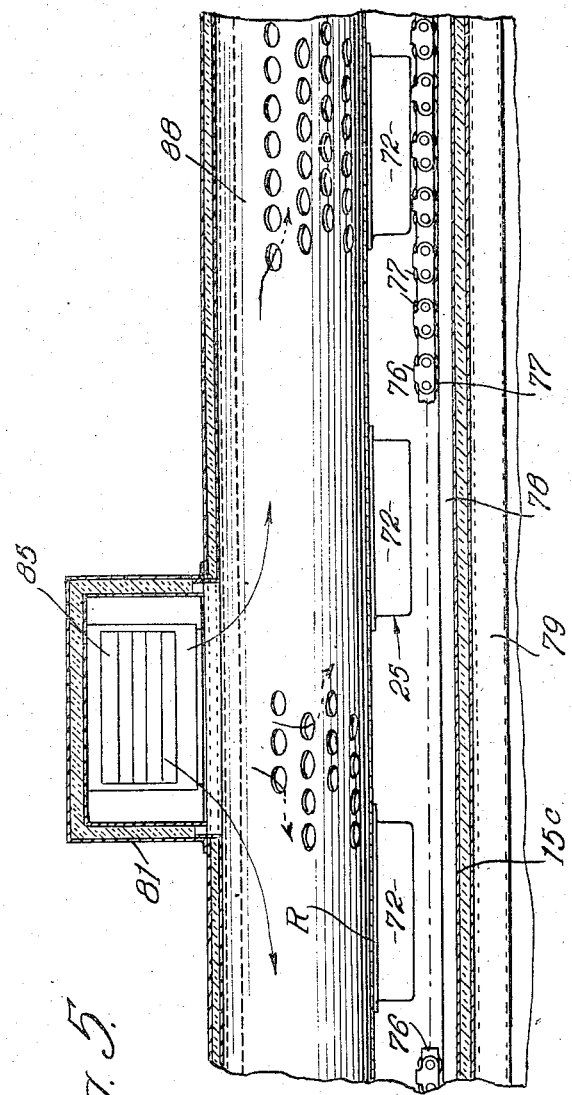
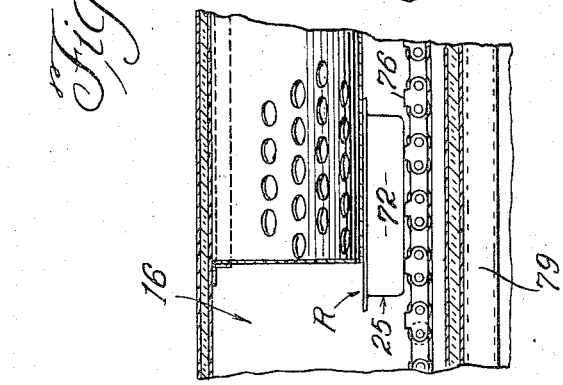
Inventor:
Edward Harding Clark
By Eugene M. Giles atty.

Feb. 29, 1944. E. H. CLARK 2,342,920
EQUIPMENT FOR MAKING SPONGY RUBBER CUSHIONS OR THE LIKE
Filed Aug. 2, 1940 5 Sheets-Sheet 4
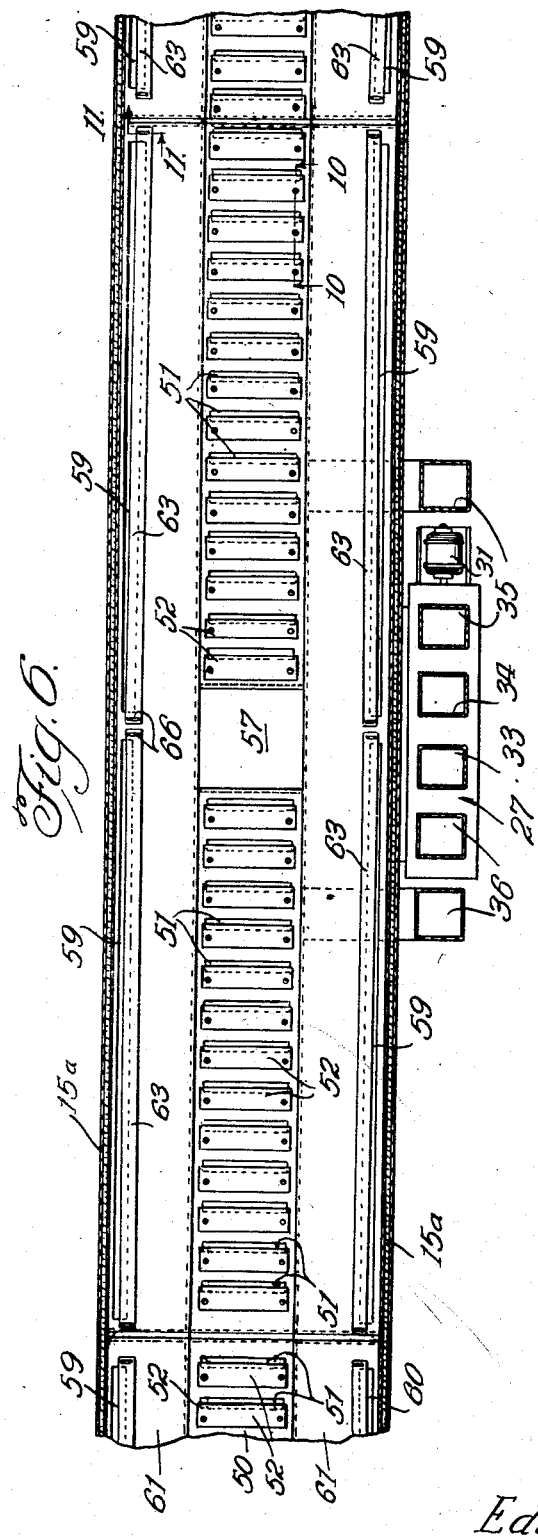
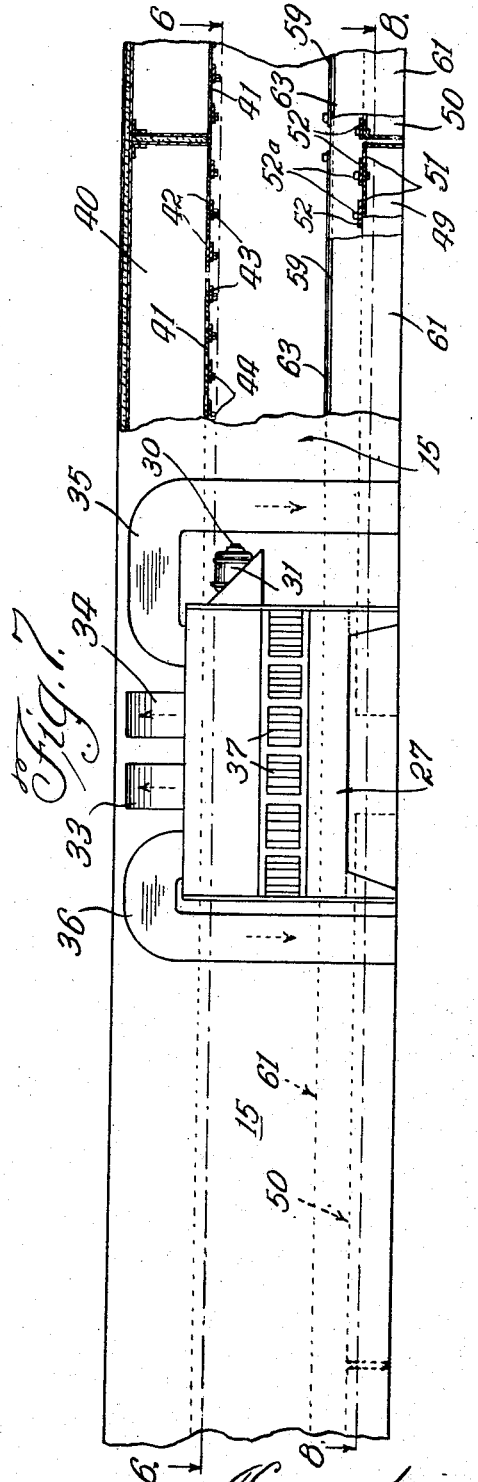
Inventor:
Edward Harding Clark
By: Eugene M. Giles
Atty.

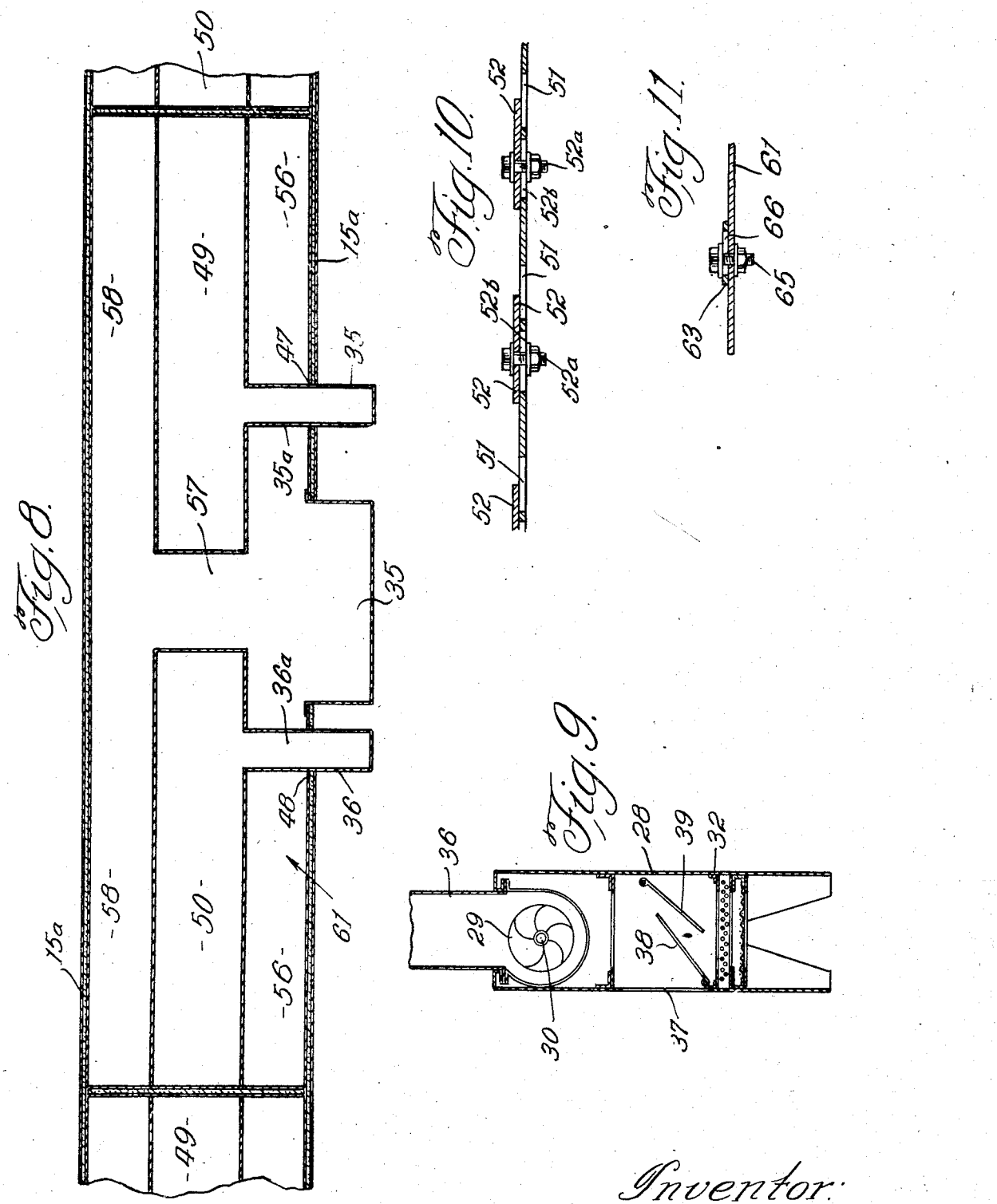

Patented Feb. 29, 1944

2,342,920

UNITED STATES PATENT OFFICE 2,342,920

EQUIPMENT FOR MAKING SPONGY RUBBER CUSHIONS OR THE LIKE

Edward Harding Clark, Mishawaka, Ind., assignor to Mishawaka Rubber and Woolen Manufacturing Company, Mishawaka, Ind., a corporation of Indiana Application August 2, 1940, Serial No. 349,741

2 Claims. (Cl. 18—4)

This invention relates to apparatus for vulcanizing and drying rubber articles, especially foam rubber articles.

One of the principal objects is to provide apparatus which will automatically convey a large number of such articles first through a vulcanizing oven and next through a dryer, at such a speed that a single passage through both the oven and the dryer is sufficient, each article being thoroughly cured before it enters the dryer and being dry according to commercial standards before it is discharged from the dryer. Other objects are to provide apparatus of the character indicated which has a large production capacity, which may be regulated and adjusted to meet different demands of the factory and the varying requirements of different products, which may subject the articles to different temperatures in different zones of the oven, which makes possible almost perfect control of the air currents used for heating, which is adaptable to line production methods and which occupies relatively little floor space. Further objects will be understood from the following description of one embodiment of the invention shown in the accompanying drawings.

In said drawings—

Fig. 1 is a top plan view omitting certain hoists and conveyors and other details;

Fig. 2 is a view in side elevation;

Fig. 3 is an enlarged vertical section on line 3—3 of Fig. 1;

Fig. 4 is a diagrammatic horizontal longitudinal section showing particularly the heating zones of the vulcanizing oven;

Fig. 5 is a vertical section on line 5—5 of Fig. 3 and on the same scale;

Fig. 6 is a horizontal section on line 6—6 of Fig. 7, but omitting the track for the pallet conveyor;

Fig. 7 is a fragmentary side elevation, with parts in vertical section;

Fig. 8 is a horizontal section on line 8—8 of Fig. 7;

Fig. 9 is a vertical section through one of the heater units;

Fig. 10 is a vertical section on line 10—10 of Fig. 6; and

Fig. 11 is a vertical section on line 11—11 of Fig. 6.

Referring particularly to said drawings, my vulcanizing oven or compartment 15 which has a dryer 16 arranged on top thereof, is provided with a suitable conveyor to move a series of molds, each containing uncured foam rubber, very slowly through the oven so that when the molds emerge from the discharge opening or end 17 of the oven, the foam rubber will be completely cured and ready for stripping from the molds. Another conveyor then moves the foam rubber articles very slowly through the dryer, so that they emerge dry according to commercial standards and ready for finishing processes. In accordance with the invention, the vulcanizing oven or compartment 15 is built something like a tunnel, and for convenience in handling the molds when stripping and pouring, the discharge opening or end 17 of the tunnel-like oven faces the receiving opening or end 18, and these ends are spaced apart only far enough to afford room for the work to be described. Adjacent the receiving end 18 the oven has a partly circular portion 19 (Fig. 1) which leads into a straight, elongated portion 20, which in turn leads into the return bend portion 21. Finally a straight portion 22, parallel to and alongside straight portion 20, terminates in the discharge end 17. A pallet type of conveyor traverses the entire length of the oven and extends also between the discharge end 17 and the receiving end 18, forming in effect a complete or continuous loop of flexibly coupled pallets 23 each having wheels 23ᵃ adapted to roll over track 24. A chain or other power driven means (not shown) causes the continuous loop or train of pallets to move at a very slow speed around the track, the speed being controllable so that the molded article will remain in the oven the length of time required for curing. On each of the pallets or platforms 23 a mold pan 25 is laid immediately before pouring the foam rubber R. Following pouring, the mold is completed by lowering the core and plate assembly 26, which rests on the mold 25 with the cores projecting into the mold cavity as shown in Fig. 3, and then the filled mold enters the oven, remaining on its pallet until the completely cured article is stripped from the mold beyond the discharge end 17.

To insure the application of heat to the top, sides and bottom of each mold so that the cure may be uniform, and within the time cycle of the pallet conveyor, heat is brought to the molds by currents of hot air whose force as well as temperature are carefully controlled. Furthermore the oven is divided into zones (Fig. 4) each of which may be heated to and maintained at a certain temperature, and the temperatures of the different zones may differ quite markedly. If the molded articles are rather large, as for example seat cushions, mattresses or the like, the time of the cure may be two hours or more, at a temperature of approximately 220° F. Steam is preferably introduced into the circulating hot air to facilitate penetration of heat into the rubber.

As shown in Fig. 4, each of the nine zones, into which the oven is divided is individually heated by controlled air currents as will be described, and each zone has its own individual heater unit 27. As appears from Figs. 7 and 9, each heater unit 27 comprises a casing 28 housing four blowers 29 all mounted on a shaft 30 driven by a motor 31, preferably a variable speed motor. The intake or suction is through the bottom of the unit (which is connected with the interior of the oven as will be described) and the air drawn in through the bottom is heated by passing over steam coils 32 before being blown out through ducts 33, 34, 35 and 36 by the blowers 29. The heat radiated by coils 32 is of course regulated by means of a steam throttling valve not shown. A suction by-pass 37 in the side of casing 28 is controlled by vanes 38, 39, vane 38 automatically opening the by-pass and simultaneously vane 39 partly closing the draft over the steam coils, thereby introducing unheated air into the system when the air discharged into the oven is above the desired temperature as determined by a thermostat not shown. The by-pass 37 is normally closed if the hot air blast is at or below the temperature setting of the thermostat. Further details of the heater unit are not shown or described as such units are well known and the particular construction thereof forms no part of the present invention.

Within the oven 15 a pressure chamber 40 is provided, preferably at the top of the oven and extending along the entire length thereof, a horizontal partition 41 dividing off the pressure chamber from the vulcanizing zones of the oven. The pressure chamber 40 is divided into sections corresponding to the zones of Fig. 4 and each section directly connected with the discharge ends of the two central ducts 33, 34 of the respective unit heater 27 so that the blasts of hot air from both of said ducts are received within the pressure chamber section and build up the pressure necessary to compel the hot air to descend into the vulcanizing zones. To control the flow of hot air from the pressure chamber to the zones below, partition 41 is shown provided with a series of elongated slots 42 (Figs. 3 and 7) extending crosswise of the oven, and a series of flat metal strips 43, each secured by bolts 44 (passing through adjustment slots, not shown) provide means for varying the effective areas of slots 42, thereby permitting regulation of the flow of hot air out of pressure chamber 40. Thus the volume of air supplied to the different zones may be varied by regulating the speed of the respective motor 31 and the openings of the slots 42 and the temperature at different zones may be varied considerably by appropriate thermostat settings of the different unit heaters.

As shown in Figs. 3, 7, and 8, the discharge ducts 35, 36 from each heater 27 bend downwardly and extend to the bottom of the oven where openings 47, 48 respectively are provided to admit inward extensions 35ᵃ, 36ᵃ of ducts 35, 36, said inward extensions terminating in lower pressure chambers 49, 50 which are separate from each other and are directly under the pallets conveying the molds. In fact the track 24 may be supported on the tops of the lower pressure chambers, as shown in Fig. 3. A series of elongated, laterally extending slots 51 are provided (Figs. 6 and 7) in the top wall of each pressure chamber 49 and 50 and adjustable sheet metal strips 52, similar to strips 43, have bolts 52ᵃ passing through adjustment slots 52ᵇ (Fig. 10) and provide means to adjust the openings of slots 51, hence to regulate the volume of hot air discharged upwardly from the lower pressure chambers. Preferably there are two pressure chambers 49, 50 at the bottom of each zone (Fig. 8) and each heater unit discharges about half its heated air into the upper pressure chamber 40 of the respective zone and the other half of the air supply in equal quantities into the two lower pressure chambers 49 and 50 of that zone. Extending along opposite sides of the pressure chambers 49 and 50 are suction chambers 61 which extend upwardly above the top of the pressure chambers 49 and 50 so as to confine the heated air from the latter chambers sufficiently to cause it to be directed against the bottom of the pallets 23 which are slotted, perforated, or otherwise formed to permit free passage of the air therethrough against the bottom of the molds 25 which preferably rest on spacers 54 on the tops of the pallets 23. From the bottoms of the molds 25 the heated air is deflected laterally toward each side of the tunnel or oven over the tops of the suction chambers 61.

As shown in Figs. 3 and 8 each heater unit has an intake 55 which is open to a suction duct 61 extending along the bottom of the oven on the near side, and is connected by a cross duct 57 with the suction duct 61 on the opposite side. Cross duct 57 extends between and separates the two lower pressure chambers 49, 50 (Figs. 6 and 8), which are interposed between the suction ducts 61. With the above construction, the heated air supplied from the top pressure chamber 40 will be discharged downwardly against the top of the mold and along the sides thereof while the heated air from the lower pressure chambers 49 and 50 will be directed against the bottom of the mold and laterally therefrom toward each side of the oven where it is collected by the suction ducts 61 for return to the respective air circulating unit 27.

To withdraw the air substantially uniformly along the length of each suction duct 61, each of these ducts is provided along the top thereof with two endwise adjoining slots 59 forming substantially a continuous opening throughout the length of the respective duct 61 and each slot 59 is tapered so that the slots 59 are wider at their outer ends remote from the suction intake of the unit heater 27 and are narrower at their inner adjoining ends. Metal strips 63, secured by adjustment bolts 65 passing through adjustment slots 66 (Fig. 11) provide adjustable dampers for the tapered slots 59.

Mounted on the top wall 15ᶜ of the oven and extending for the greater part of the length of the straight portion 20 of the oven is the dryer 16, Figs. 1 and 2. The dryer 16 is an oven having a straight tunnel-like structure, open at both ends, with its receiving end 70 not far from the receiving end 18 of the oven and its discharging end 71 extending beyond the return bend portion 21 of the oven. The cured foam rubber articles stripped from molds 25 beyond the discharge end 17 of the oven are placed on dryer pans 72 carried by an endless dryer conveyor which extends throughout the length of dryer 16, and are carried very slowly through the dryer, being subjected therein to circulating air at a suitable temperature to dry the rubber articles in their passage through the dryer 16. At the discharging end 71 the drying pans 72 slide onto a roller conveyor 73 which carries the pans to an endless chain conveyor 74 that extends over portions 21 and 22 of the oven and returns the drying pans to the stripping station (Fig. 1). Standing next to the roller conveyor 73 are operators who lift the dry cushions off the pans and load them onto trucks (not shown) to be carted away for finishing operations. The conveyor 74 of course travels at the same speed as the dryer conveyor, which will now be described.

The dryer conveyor comprises two endless chains 75 (Figs. 3 and 5) with cross slats 76 which support the pans 72 and said chains, which are mounted in the usual manner on sprockets and operated in any convenient manner, have rollers 77 which travel on tracks 78 carried by the top wall 15c of the oven, which forms the bottom of the dryer. At each end of the dryer these chains 75 pass through the top wall 15c so that the return lengths thereof are under said wall at the top of the pressure chamber 40 which is provided with return tracks 79 therefor. Conveyor 74 may be exactly like the dryer conveyor, except that it is shorter, and may be supported in the same manner, and hence requires no further description.

Mounted on top of the dryer 16 are a series of insulated pent-houses 81 (Figs. 1, 2, 3 and 5) each of which is open at one end as at 82 to admit atmospheric air. A blower 83 driven by a motor 84 sucks air through intake 82 and blows it through a unit heater 85 and discharges it into the dryer 16. Each pent-house 81 is essentially a hot air duct and intake, and there will be as many such pent-houses as are found necessary to maintain the required air circulation and temperature in the interior of the dryer. At the end opposite intake 82, each pent-house is curved downwardly as shown in Fig. 3, and the downcurved end discharges through an opening 86 in top wall 87 of the dryer, thus forcing a controlled volume of hot air into the top of the dryer. A slotted or perforated and curved baffle 88 below opening 86 provides what is in effect a low pressure chamber 89 in one corner and extending a substantial distance along dryer at each side of the pent-house as shown in Fig. 1 to distribute the air from the blower along the dryer. The shape and location of baffles 88 are such that they direct the heated air directly against the foam rubber article R, and these hot air currents swirl all around and through the body of the article and abstract nearly all of its moisture during the time the article moves through the dryer.

In the operation of this apparatus, assuming that a mold 25 is in place on a pallet 23 ahead of the entrance or receiving end 18 of the oven, the foam rubber will be poured into the open mold pan and then the core assembly 26, which has been pre-heated in an elevated tank 90 (Figs. 1 and 2) containing hot water, will be lowered by a hoist (not shown) upon the open mold. All this takes place while the pallet, as part of the continuously moving oven conveyor, slowly progresses toward the open mouth of the oven. The pallet now moves into and through the oven as already described and emerges at the discharge end 17. At the same time a drying pan 72 is delivered at the discharge end of the conveyor 74, which of course is elevated relative to the pallet conveyor. The mold 25 on the pallet under consideration is now opened, the core assembly 26 being hoisted therefrom, and the molded article which is usually lifted out of the mold 25 with the core assembly, is stripped from the latter after which the core assembly is further lifted by means of the hoist and placed in the tank 90 so that the cores extend into the hot water. This hoist (not shown) may be carried on a monorail 91 to operate at the stripping station and over the hot water tank and at the loading station.

The molds 25 remain on the pallets 23 and the pans 72 may be supported on these molds for conveyance to the place where the vulcanized articles are introduced into the dryer 16. Assuming therefore that a pan 72 from the conveyor 74 has been placed on the molds 25 immediately ahead of the mold 25 from which the molded article is removed as aforesaid, the molded article when stripped from the core assembly 26 will be placed on that pan and will continue therewith under the hot water tank 90 and as it emerges from thereunder the pan 72 and its molded article will be lifted from the pallet conveyor and placed on the conveyor 75—76 at the entrance 70 to the dryer 16.

Then as each mold 25 passes beyond the hot water tank 90 and the pan 72 and molded article removed therefrom, such mold is filled to the required extent with the foam rubber, after which a core assembly 26, heated to the proper temperature in the hot water bath 90, is removed from the latter and placed on the foam filled mold which then enters and passes through the vulcanizer 15.

Thus the molds are continuously supplied to the loading station and there filled and closed with the core assembly and then passed successively through the vulcanizer 15, to the stripping station where the molded article is removed, the molds passed on to the loading station and the core assemblies treated in the heater tank 90 after which these molds are filled and supplied with core assemblies and carried through the vulcanizer 15 again.

At the same time the vulcanized articles on the pans 72 are being propelled through the dryer 16 at a corresponding rate so that as each vulcanized article emerges from the vulcanizer outlet 17 a dried article will have been removed from a pan 72 at the discharge end of the dryer and the pan supplied by the conveyors 73 and 74 to the stripping location ready for reuse as the articles are stripped from the molds 25 or core assemblies 26.

While I have described a preferred embodiment of my invention in considerable detail, many changes and modifications may be made without departing from the principles of my invention, the scope of which is to be determined by the appended claims.

I claim as my invention:

1. In combination with a vulcanizing oven in the form of a flattened loop with a discontinuous section providing separated, opposed ends, one end for receiving molds or products, the other for discharging the same after completion of the curing process; a continuous pallet conveyor traversing the vulcanizing oven; a drying oven on top of one side of the flattened loop, said drying oven being straight and open at both ends; the receiving end of the drying oven being between said separated ends of the vulcanizing oven but to one side of the discontinuous section of the vulcanizing oven; an endless conveyor having its upper length in the bottom of the drying oven and its lower length in the top of the vulcanizing oven, and adapted to carry articles at slow speed through the drying oven; and an endless conveyor having its upper length on top of the vulcanizing oven parallel to and alongside the drying oven, and its lower length inside of the vulcanizing oven at the top, said last named conveyor being adapted to receive drying forms from the discharging end of the drying oven and to convey said forms toward the receiving end of the drying oven.

2. In combination with a vulcanizing oven, a drying oven on top of the vulcanizing oven, an endless conveyor which has its upper length in the bottom of the drying oven and which has its lower length in the top of the vulcanizing oven; and separate independently operated means to blow heated air into both ovens.

EDWARD HARDING CLARK.